United States Patent
Hidano et al.

(10) Patent No.: US 7,931,736 B2
(45) Date of Patent: Apr. 26, 2011

(54) PRE-PURIFICATION UNIT OF CRYOGENIC AIR SEPARATION UNIT, HYDROCARBON ADSORBENT, AND METHOD OF PRE-TREATING FEED AIR

(75) Inventors: Tatsuya Hidano, Kai (JP); Morimitsu Nakamura, Kai (JP); Masato Kawai, Yokohama (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 1131 days.

(21) Appl. No.: 10/594,998

(22) PCT Filed: Mar. 29, 2005

(86) PCT No.: PCT/JP2005/005939
§ 371 (c)(1),
(2), (4) Date: Sep. 29, 2006

(87) PCT Pub. No.: WO2005/094986
PCT Pub. Date: Oct. 13, 2005

(65) Prior Publication Data
US 2007/0209518 A1 Sep. 13, 2007

(30) Foreign Application Priority Data
Mar. 30, 2004 (JP) ................. 2004-099683

(51) Int. Cl.
*B01D 53/02* (2006.01)
(52) U.S. Cl. ............... 95/120; 95/129; 95/143; 95/145; 95/902; 96/108; 96/154
(58) Field of Classification Search .............. 95/120, 95/129, 143, 145, 902; 502/78, 79; 96/108, 96/154
See application file for complete search history.

(56) References Cited

U.S. PATENT DOCUMENTS

| 5,980,611 | A  |   | 11/1999 | Kumar et al. |
| 6,106,593 | A  | * | 8/2000  | Golden et al. .............. 95/120 |
| 6,273,939 | B1 |   | 8/2001  | Millet et al. |
| 6,350,298 | B1 |   | 2/2002  | Su et al. |
| 6,406,520 | B1 |   | 6/2002  | Lledos |

(Continued)

FOREIGN PATENT DOCUMENTS

CN 1377333 A 10/2002

(Continued)

OTHER PUBLICATIONS

Reyhing, "Removing hydrocarbons from the process air of air-separation . . . ", Linde Reports on Science and Technology, 36/1983.

(Continued)

*Primary Examiner* — Jill Warden
*Assistant Examiner* — Joye L Woodard
(74) *Attorney, Agent, or Firm* — Nixon & Vanderhye P.C.

(57) ABSTRACT

A hydrocarbon adsorbent that includes a zeolite with either a H-FER structure or a MOR structure in which the pore diameter has been adjusted by ion exchange. A propane adsorbent that includes a zeolite with a MFI structure. A hydrocarbon removal unit that includes a TSA pre-purification unit having a column packed with sequential layers of activated alumina, a NaX zeolite, and the hydrocarbon adsorbent. A method of reducing the hydrocarbon content within liquid oxygen inside a cryogenic air separation unit that includes purifying feed air with the above pre-purification unit.

2 Claims, 3 Drawing Sheets

FER

U.S. PATENT DOCUMENTS

| | | | |
|---|---|---|---|
| 6,432,171 | B1 | 8/2002 | Kumar et al. |
| 6,824,588 | B2 | 11/2004 | Nakamura et al. |
| 2002/0108494 | A1 | 8/2002 | Sircar et al. |

FOREIGN PATENT DOCUMENTS

| | | |
|---|---|---|
| EP | 1078685 | 2/2001 |
| EP | 1 129 774 A | 9/2001 |
| EP | 1 214 964 A | 6/2002 |
| FR | 2 834 915 A | 7/2003 |
| JP | 5-172458 | 7/1993 |
| JP | 6-55001 | 3/1994 |
| JP | 7-324858 | 12/1995 |
| JP | 9-168715 | 6/1997 |
| JP | 10-66801 | 3/1998 |
| JP | 10-202060 | 8/1998 |
| JP | 11-253736 | 9/1999 |
| JP | 2000-107546 | 4/2000 |
| JP | 2000-140550 | 5/2000 |
| JP | 2000-157862 | 6/2000 |
| JP | 2001-062238 | 3/2001 |
| JP | 2001-087646 | 4/2001 |
| JP | 2001-104737 | 4/2001 |
| JP | 2001-129342 | 5/2001 |
| JP | 2001-293368 | 10/2001 |
| JP | 2002-126436 | 5/2002 |
| JP | 2002-143628 | 5/2002 |
| JP | 2002-143677 | 5/2002 |
| JP | 2002-154821 | 5/2002 |
| JP | 2003-126689 | 5/2003 |

OTHER PUBLICATIONS

Meier et al, Atlas of Zeolite Structure Types, $4^{th}$ ed., Elsevier (1996).

Neyestanaki et al, "Catalytic Combustion of Propane and Natural Gas Over Cu and Pd Modified ZSM Zeolite Catalysts", Applied Catalysis B: Environmental, Elsevier, vol. 7, No. 1-2, Dec. 7, 1995, pp. 95-111; XP022216825.

Martens et al, "Verringerung des NOx-Gehalts in Abgasen aus Magermixotoren . . . ", Angew. Chem., vol. 110, No. 13/14, 1998, pp. 2003-2006; XP002520905 (partial translation).

Komatsu et al, "Selective formation of alkenes through the cracking of n-heptane . . . ", Applied Catalysis A: General, Elsevier Science, Amsterdam, NL, vol. 214, No. 1, Jun. 15, 2001, pp. 103-109; XP004239120.

Beerdsen et al, "The Influence of Non-framework Sodium Cations on the Adsorption of Alkanes in MFI- and MOR-Type Zeolites", Journal of Physical Chemistry B (2002), 106(41), 10659-10667; XP002520906.

Adsorption Science and Technology, Proceedings of the Pacific Basin Conference, $3^{rd}$, Kyongju, Republic of Korea, May 25-29, 2003, 162-166. Editor(s): Lee, Chang-Ha. Publisher: World Scientific Publishing Co. Pte. Ltd., Singapore, Singapore; XP-002520907.

Office Action in Chinese 200580010113.9 dated Feb. 5, 2010 (with English translation).

* cited by examiner

PRE-PURIFICATION UNIT OF CRYOGENIC AIR SEPARATION UNIT, HYDROCARBON ADSORBENT, AND METHOD OF PRE-TREATING FEED AIR

This application is the US national phase of international application PCT/JP2005/005939 filed 29 Mar. 2005, which designated the U.S. and claimed priority of JP 2004-099683 filed 30 Mar. 2004, the entire contents of each of which are hereby incorporated by reference.

TECHNICAL FIELD

The present invention relates to a pre-purification unit that constitutes part of a cryogenic air separation unit and is used for removing small quantities of hydrocarbons contained within air, an adsorbent used within such a pre-purification unit, and a method of pre-treating feed air that reduces the level of hydrocarbons within liquid oxygen inside the cryogenic air separation unit.

Priority is claimed on Japanese Patent Application No. 2004-99683, filed Mar. 30, 2004, the content of which is incorporated herein by reference.

BACKGROUND ART

Gases such as nitrogen and oxygen are the most widely and heavily used gases in industry. These gases are typically produced using a cryogenic air separation method in which air is cooled, liquefied, and then separated by distillation.

However, if the air contains components that solidify at the temperatures used during liquefaction, then the fluid passages can become plugged, making operation of the unit impossible. In order to avoid such problems, the air is generally treated by a pre-purification unit to remove these plugging components prior to cooling of the air. The main plugging components removed by this type of pre-purification unit are water and carbon dioxide.

Thermal Swing Adsorption (TSA) is the most widely used method of pre-purification, and has been reported in numerous documents and patents. In a typical TSA pre-purification unit, the column is packed with layers of two different adsorbents, with activated alumina used for removing water in the upstream portion of the column, and a synthetic zeolite used for removing carbon dioxide in the downstream portion of the column. Considering factors such as the quantity of carbon dioxide adsorbed at low partial pressures and the cost of the adsorbent, NaX zeolites are the most widely used synthetic zeolites.

However, in recent years it has become clear that in order to ensure the safety of cryogenic air separation units, components such as dinitrogen monoxide and hydrocarbons must be removed in addition to the components described above.

Air contains approximately 0.3 ppm of dinitrogen monoxide, and this dinitrogen monoxide acts as a plugging material in a similar manner to water and carbon dioxide. Conventionally, because of its low concentration within feed air, dinitrogen monoxide has not been considered as a component that requires removal, but as a result of increases in the dinitrogen monoxide concentration in the atmosphere, as well as changes in gas behavior within cryogenic air separation units as a result of improvements, modifications and performance gains within these units, dinitrogen monoxide is now considered a component that should be targeted for removal.

The hydrocarbons which are contained in air are mainly light hydrocarbons of 1 to 3 carbon atoms, and specific examples include methane, acetylene, ethylene, ethane, propylene, and propane. The concentration of methane in air is comparatively high (approximately 1.6 ppm). The other hydrocarbon components exist only in trace quantities in the order of ppb. These hydrocarbons dissolve in, and become concentrated within liquid oxygen, and because they can cause combustion or explosions within the unit, the hydrocarbon concentration within the liquid oxygen needs to be controlled using the solubility and the explosive range as indicators. Specifically, liquid oxygen in which the hydrocarbons have been concentrated is discharged from the unit in a liquid oxygen purge in order to ensure that the hydrocarbon concentration within the liquid oxygen does not exceed a certain level. The hydrocarbon concentration within this purged liquid oxygen is prescribed by law.

However, as a result of the aforementioned types of changes in gas behavior within cryogenic air separation units as a result of improvements, modifications and performance gains within these units, the possibility of localized concentrating of hydrocarbons in locations outside of the liquid oxygen sump into which the purged liquid oxygen is extracted cannot be ruled out. From the outset, the introduction of components that are likely to jeopardize the safety of the unit is not at all desirable, and hydrocarbons should preferably also be removed at the pre-purification stage.

Reyhing et al. showed that with conventional pre-purification units, although propylene and acetylene could be removed, dinitrogen monoxide and other hydrocarbons could not be completely removed. The results of recent investigations conducted by cryogenic air separation unit makers into adsorbents capable of removing these other components are disclosed in the document: (Linde Reports on Science and Technology, 36/1983, Dr J. Reyhing).

Japanese Unexamined Patent Application, First Publication No. Hei 11-253736 discloses that ethylene can be removed from air using an X or LSX zeolite that has undergone ion exchange with calcium.

Japanese Unexamined Patent Application, First Publication No. 2000-140550 discloses that dinitrogen monoxide and ethylene can be removed from air using an X or LSX zeolite that has undergone ion exchange with calcium.

Japanese Unexamined Patent Application, First Publication No. 2000-107546 discloses that dinitrogen monoxide and ethylene can be removed from air using a binderless X zeolite that has undergone ion exchange with calcium.

Japanese Unexamined Patent Application, First Publication No. 2001-62238 discloses that dinitrogen monoxide, ethylene, and propane can be removed from air using an A or X zeolite that has undergone ion exchange with calcium.

Japanese Unexamined Patent Application, First Publication No. 2002-126436, Japanese Unexamined Patent Application, First Publication No. 2002-143628, and Japanese Unexamined Patent Application, First Publication No. 2002-154821 disclose that dinitrogen monoxide and hydrocarbons can be removed using a Ca-LSX, Ca-A composite adsorbent.

Japanese Unexamined Patent Application, First Publication No. 2002-143677 discloses that dinitrogen monoxide and hydrocarbons can be removed from air using a binderless LSX zeolite that has undergone ion exchange with calcium.

Japanese Unexamined Patent Application, First Publication No. 2001-129342 discloses that dinitrogen monoxide and ethylene can be removed from air using an LSX zeolite that has undergone ion exchange with calcium.

The adsorbents of these patent documents are X (LSX) type zeolite or A type zeolite which are ion exchanged with calcium.

Calcium ion exchange is effective for adsorbing components that mainly a specific mutual interaction, including dinitrogen monoxide and particular hydrocarbons such as ethylene. Said zeolites, however, are thought to make no significant contribution to the adsorption of components such as propane that exhibit no such specific interaction. Indeed, in most of the patent documents described above, the only components for which significant effects were observed in the examples were dinitrogen monoxide and ethylene.

Amongst the various hydrocarbons, current technology allows ethylene, acetylene, and propylene to be removed comparatively easily, but the remaining hydrocarbons such as methane, ethane, and propane (all of which are saturated hydrocarbons) cannot be efficiently adsorbed and removed.

Testing involving the removal of hydrocarbons by adsorption is also being conducted in the field of vehicle exhaust gas treatment. The exhaust gas from vehicles is generally treated using a catalyst.

Usually, the temperature of the catalyst immediately following engine startup is low, meaning the catalytic activity is also low, and consequently the exhaust gas is discharged into the atmosphere without treatment. Accordingly, for the period until the temperature of the catalyst rises sufficiently to increase the catalytic activity, these hydrocarbon emissions are prevented from being discharged by temporarily adsorbing the hydrocarbons within the exhaust gas in a zeolite trap that is provided in a separate preliminary stage. Subsequently, when the temperature of the exhaust gas increases, the hydrocarbons adsorbed to the zeolite desorb, and are treated by the latter stage catalyst. Alternatively, in those cases where the zeolite trap itself exhibits catalytic action, treatment may also occur within the trap.

Existing technology within this field includes, for example, that described in Japanese Unexamined Patent Application, First Publication No. 2001-293368, which discloses that a zeolite containing an alkali metal such as Cs and with a $SiO_2/Al_2O_3$ ratio of 10 or greater is effective in the treatment of exhaust gas from an internal combustion engine. This document discloses that toluene can be adsorbed using a Cs-ZSM5 or K-ZSM5 adsorbent. Furthermore, because the treatment target is the exhaust gas from an internal combustion engine, a larger $SiO_2/Al_2O_3$ ratio is reported as being more favorable in terms of preventing desorption at low temperatures and ensuring favorable heat resistance.

Japanese Unexamined Patent Application, First Publication No. 2003-126689 discloses that a zeolite in which the $SiO_2/Al_2O_3$ ratio is 30 or greater and the absolute value of the oxygen charge is 0.210 or greater is effective in the treatment of exhaust gas from an internal combustion engine.

Japanese Unexamined Patent Application, First Publication No. 2001-293368 and Japanese Unexamined Patent Application, First Publication No. 2003-126689 list the following conditions as the main usage conditions under which a hydrocarbon-adsorbing zeolite is used within the field of vehicle exhaust gas treatment.

(1) The exhaust gas contains a comparatively large quantity of water.

(2) The temperature of the exhaust gas is 600° C. or higher (and during high speed operation may be 1,000° C. or higher).

(3) Hydrocarbons will not desorb until a suitably high temperature is reached.

(4) Even at low estimates, hydrocarbon concentration is several dozen ppm, and in practical examples is approximately several thousand ppm.

Zeolite adsorbs water molecule with high polarity preferentially, so the hydrocarbon adsorption performance tends to deteriorate. Accordingly, an adsorbent that exhibits excellent hydrocarbon adsorption performance even in the presence of water is keenly sought. Generally, zeolites in which the Si/Al ratio is low are more strongly affected by the presence of water, and consequently in the field of vehicle exhaust gas treatment, zeolites with high Si/Al ratios tend to be used.

Because they are used at high temperatures, the zeolites must exhibit high levels hydrothermal resistance. Although dependent on the variety of zeolite used, zeolites are generally said to be prone to structural breakdown under conditions of high temperature and water. Generally, zeolites with higher Si/Al ratios tend to exhibit higher levels hydrothermal resistance.

If the activity of the catalyst at a subsequent stage to the adsorbent is not raised by increasing the temperature, then the gas containing the hydrocarbons cannot be treated, and consequently a zeolite that is able to retain (adsorb) the hydrocarbons until a high temperature is reached is required.

As described above, unlike the conditions required for zeolites used in the treatment of vehicle exhaust gases, the usage conditions for zeolites used in TSA units that function as the pre-purification units for cryogenic air separation units are as follows.

(1) Air with a lower water content than an exhaust gas is purified.

(2) Adsorption occurs at normal temperatures of 5 to 40° C., and regeneration occurs at a comparatively low temperature of 100 to 300° C.

(3) The zeolite does not require high levels hydrothermal resistance.

(4) The hydrocarbon concentration within the air (with the exception of methane) is in the order of several dozen ppb.

In a TSA unit, air with a comparatively low water content is treated. Furthermore, if an adsorbent exhibits particular weakness in the presence of water, then by using the adsorbent downstream from another adsorbent that is used for removing water, hydrocarbon adsorption can be conducted in the absence of water. Moreover, in terms of factors such as running costs, the regeneration temperature is preferably kept as low as possible. In other words, in complete contrast to the adsorbents used in the treatment of vehicle exhaust gases, which must adsorb and retain the hydrocarbons right up to high temperatures, the hydrocarbon adsorbent in a TSA unit should desorb readily at low temperatures. Furthermore, because hydrothermal resistance is not required, there is no need to increase the Si/Al ratio.

DISCLOSURE OF INVENTION

In the field of pre-purification units for cryogenic air separation units, a large variety of adsorbents are being investigated for the removal of trace quantities of hydrocarbons from feed air. The hydrocarbon composition of vehicle exhaust gases is very different from that in the atmosphere. As a result, the hydrocarbons disclosed in the above documents relating to the field of vehicle exhaust gas treatment are limited to hydrocarbons of high polarity and large molecular weight hydrocarbons. Adsorbents for these types of hydrocarbons exhibit poor adsorption of light, saturated hydrocarbons such as methane, ethane, and propane. Of these, no examples exist for an adsorbent capable of removing propane, which has a low solubility in liquid oxygen and a comparatively high danger level. In particular, no adsorbent has been disclosed that is capable of efficiently adsorbing trace quantities of propane at the ppb level, and is able to be used as a TSA adsorbent.

As described above, the hydrocarbon concentration within air is no higher than 1/1000th that of the hydrocarbon concentration (partial pressure) within a vehicle exhaust gas. The adsorption quantity varies depending on the pressure, namely the partial pressure, and even if the adsorption quantity is large in a region with a high partial pressure, this does not necessarily mean that the adsorption quantity will also be large in a region of low partial pressure. Moreover, as the partial pressure falls, competing adsorption from other components inhibits the adsorption of the target compound, making adsorption even more difficult. Accordingly, in order to ensure favorable adsorption of a specific component in a low concentration region, the adsorption must occur with a powerful force.

One typical method of removing a low concentration component at the ppb level uses a getter adsorbent. Since it is chemical adsorption, it adsorbs very strong. So regeneration is very difficult, and usually the adsorbent is simply replaced rather than being regenerated.

On the other hand, pre-purification units assume repeated adsorption and regeneration. For the strong adsorbing power of the getter adsorbent, it is difficult to desorb at the low temperature described above. Accordingly, achieving a combination of effective adsorption and removal of a low concentration component at the ppb level, and favorable regeneration at a low temperature is far from simple.

As described above, the use conditions in pre-purification units for cryogenic air separation units are very different from those in the treatment of vehicle exhaust gas. Therefore, a hydrocarbon adsorbent that is particularly suited to pre-purification is required.

A variety of different adsorbents have been investigated for removing the hydrocarbons that exist in air as trace impurities, but an adsorbent capable of efficiently removing saturated hydrocarbons such as methane and ethane, and in particular propane, which has a low solubility in liquid oxygen and a comparatively high danger level, has not yet been discovered. Accordingly, a hydrocarbon adsorbent that is capable of removing hydrocarbons at the low concentration levels found in the atmosphere, and is suited to the pre-purification conditions of a cryogenic air separation unit has been keenly sought. An object of the present invention is to provide a hydrocarbon adsorbent that is capable of efficiently removing ultra low concentrations of propane from feed air, and a pre-purification unit capable of removing hydrocarbons. Another object of the present invention is to provide a method of reducing hydrocarbons, and particularly propane, within liquid oxygen inside a cryogenic air separation unit.

A pre-purification unit of the present invention is a pre-purification unit of a cryogenic air separation unit, and is a TSA pre-purification unit having a column packed with a hydrocarbon adsorbent containing a zeolite with a H-FER structure or a MOR structure in which the pore diameter has been adjusted by ion exchange.

This column is preferably packed with sequential layers of activated alumina, a NaX zeolite, and the above hydrocarbon adsorbent.

A pre-purification unit of the present invention is a pre-purification unit of a cryogenic air separation unit, and is a TSA pre-purification unit having a column packed with a propane adsorbent containing a zeolite with a MFI structure.

This column is preferably packed with sequential layers of activated alumina, a NaX zeolite, and the above propane adsorbent.

A hydrocarbon adsorbent of the present invention is an adsorbent that is used in a pre-purification unit of a cryogenic air separation unit, and is preferably a zeolite that has at least one straight channel.

The above hydrocarbon adsorbent preferably has a H-FER structure.

The above hydrocarbon adsorbent preferably has a MOR structure in which the pore diameter has been adjusted by ion exchange.

A propane adsorbent of the present invention is an adsorbent that is used in a pre-purification unit of a cryogenic air separation unit, and is preferably a zeolite with a MFI structure that has at least one straight channel.

The above propane adsorbent preferably has a pore diameter, formed by ion exchange, that is essentially equal to the size of a propane molecular ion.

Ion exchange of the propane adsorbent is preferably conducted using either one, or two or more elements selected from the group consisting of Na, Cu, Li, K, Mg, Ca, Zn, Ag, Ba, Cs, Rb, and Sr.

It is thought that in the case of an H ion exchanged zeolite in which the Si/Al ratio is high, even if the zeolite has a MFI structure or a MOR structure, the pore diameter is still overly large, resulting in a poor propane adsorption performance.

A propane adsorbent of the present invention is an adsorbent that is used in a pre-purification unit of a cryogenic air separation unit, and is a zeolite that has at least one straight channel, and has a Si/Al ratio of no more than 100.

A method of pre-treating feed air according to the present invention that reduces the hydrocarbon concentration within liquid oxygen inside a cryogenic air separation unit is a method that uses a TSA pre-purification unit having a column packed with a zeolite with a H-FER structure or a MOR structure in which the pore diameter has been adjusted by ion exchange.

A method of pre-treating feed air according to the present invention that reduces the propane concentration within liquid oxygen inside a cryogenic air separation unit is a method that uses a TSA pre-purification unit having a column packed with a zeolite with a MFI structure.

The feed air supply conditions within a TSA pre-purification unit according to the present invention preferably include a pressure within a range from 300 kPa to 1 MPa (absolute pressure) and a temperature within a range from 5 to 40° C., and the conditions during the adsorption step preferably also comply with these ranges. The conditions during the regeneration step preferably include a pressure that is close to atmospheric pressure and a temperature within a range from 100 to 300° C.

An actual configuration for a TSA pre-purification unit of a cryogenic air separation unit according to the present invention utilizes layered packing of activated alumina as a first adsorbent for removing water, and a NaX zeolite as a second adsorbent for removing carbon dioxide together with a third adsorbent. The order of layering should be fixed with the activated alumina upstream and the NaX positioned downstream. The reason for this requirement is that the carbon dioxide adsorption performance of the NaX zeolite deteriorates in the presence of water, meaning the water must be removed first.

In those cases where the adsorbent of the present invention uses an adsorbent with a low Si/Al ratio, which suffers a deterioration in adsorption performance in the presence of water, this adsorbent is preferably also packed in a layer downstream from the activated alumina.

From the above description it is evident that by using a zeolite having at least one straight channel as a hydrocarbon adsorbent within a pre-purification unit, ultra low concentrations of hydrocarbons, and particularly propane, can be removed from air.

BEST MODE FOR CARRYING OUT THE INVENTION

Embodiments

Figure 1:
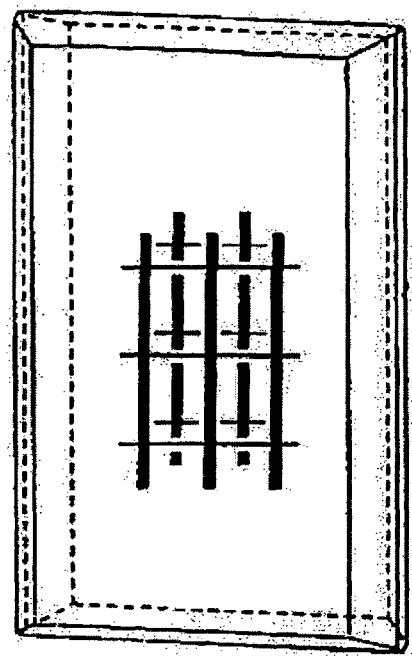
FIG. 1 is a schematic representation of pores within a FER adsorbent.
Figure 2:
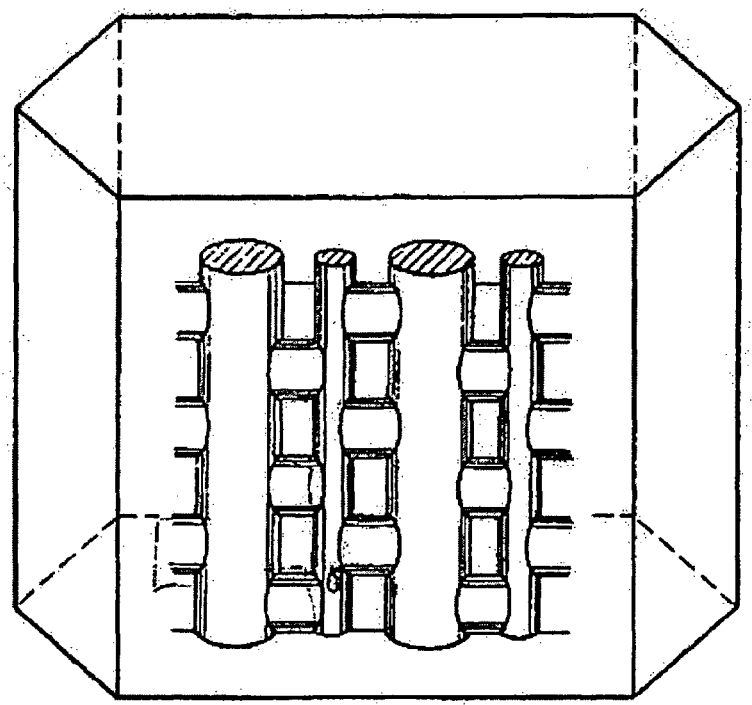
FIG. 2 is a schematic representation of pores within a MOR adsorbent.
Figure 3:
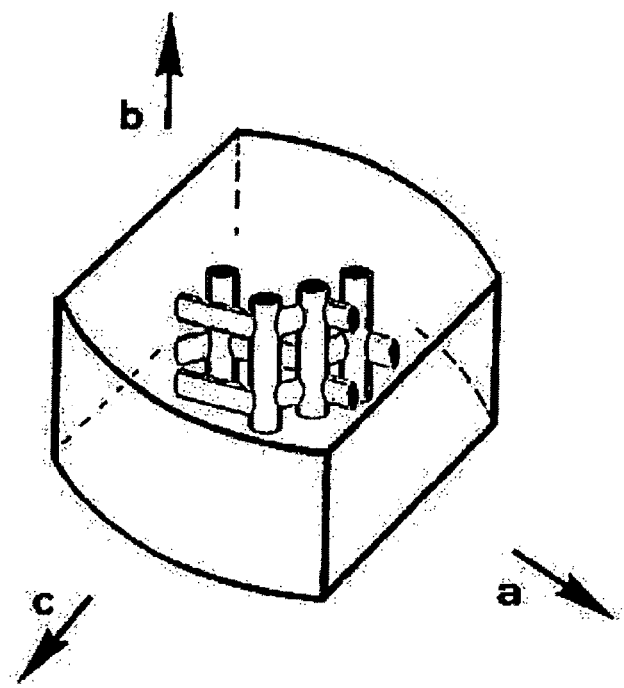
FIG. 3 is a schematic representation of pores within a MFI adsorbent.
Figure 4:
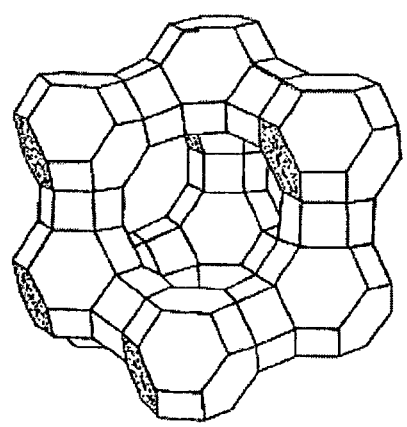
FIG. 4 is a schematic representation of pores within a X adsorbent.

The hydrocarbon adsorption quantities of FER, MOR, MFI and X adsorbents were measured.

Schematic representations of the pores within FER, MOR, MFI and X adsorbents are shown in FIG. 1 through FIG. 4 respectively.

An FER adsorbent has pores with a short axis of 0.42 nm and a long axis of 0.54 nm (i.e., a pore size of 0.42×0.54 nm), and a straight channel with a short axis of 0.35 nm and a long axis of 0.48 nm (i.e., a pore size of 0.35×0.48 nm), forming a two dimensional pore structure.

An MOR adsorbent has pores with a short axis of 0.26 nm and a long axis of 0.57 nm (i.e., a pore size of 0.26×0.57 nm), and a straight channel with a short axis of 0.65 nm and a long axis of 0.70 nm (i.e., a pore size of 0.65×0.70 nm), forming a two dimensional pore structure.

An MFI adsorbent has a straight channel with a short axis of 0.53 nm and a long axis of 0.56 nm (i.e., a pore size of 0.53×0.56 nm), and a zigzag channel with a short axis of 0.51 nm and a long axis of 0.55 nm (i.e., a pore size of 0.51×0.55 nm), and these channels intertwine to form a three dimensional pore structure.

The pores of an X adsorbent have a cavity portion known as a super cage, and the adsorbent has a three dimensional pore structure.

These pore diameter and straight channel diameter values for the adsorbents are used for structurally classifying the zeolite, and represent numerical values calculated on the basis of the oxygen ion radius (0.135 nm) that forms a portion of the pore. The actual pore diameter differs depending on the effects of covalent bonding and lattice vibration, as well as factors such as the composition (Si/Al ratio, ion type), the temperature, and the state of hydration. For details, refer to W. H. Meier, D. H. Olson, Ch. Baerlocher ed., Atlas of Zeolite Structure Types, 4th Ed., Elsevier (1996).

For 12 types of adsorbents, the hydrocarbon adsorption quantity was measured using the breakthrough curve measurement method described below.

This measurement method is a method in which the treatment gas containing the adsorbate flows up from the bottom of a column packed with the adsorbent, and the composition of the gas discharged from the top of the column is then analyzed.

A column with an internal diameter of 17.4 mm and a packing height of 400 mm was packed with the adsorbent, and in preparation for the measurement, the adsorbent was subjected to 10 hours of heat regeneration by heating the adsorbent to a temperature of 473 K, while nitrogen was passed through the column under atmospheric pressure at a flow rate of 2 liters/min.

The measurement conditions involved holding the column at a temperature of 283 K and a pressure of 550 kPa, and then introducing a treatment gas containing 1 ppm of hydrocarbon mixed with nitrogen gas into the bottom of the column at a flow rate of 11.96 liters/min. Under these conditions, the gas flow rate inside the column was approximately 160 mm/min. These conditions of temperature, pressure, and flow rate are selected in accordance with the conditions of a typical TSA pre-purification unit.

Compositional analysis of the gas discharged from the top of the column was conducted using a process gas analyzer (RGA5) manufactured by Trace Analytical Inc. This analyzer enables compositional analysis of hydrocarbons at the ppb level.

Based on the results of this compositional analysis, the hydrocarbon adsorption quantity of an adsorbent can be estimated. Specifically, if a graph is plotted using the point where flow of the treatment gas flow was started as the origin, with time along the horizontal axis and hydrocarbon concentration along the vertical axis, then the hydrocarbon is not detected during the period where the adsorbent is adsorbing the hydrocarbon, but eventually the adsorbent is unable to continue adsorbing the hydrocarbon, causing a gradual increase in the hydrocarbon concentration at the column exit. Once the entire hydrocarbon adsorption quantity of the adsorbent within the column has been saturated, the analyzed value at the column exit will reach the same value as the concentration at the inlet. A curve that represents this type of situation is known as a breakthrough curve, and based on this breakthrough curve, together with conditions such as the flow rate and concentration of the treatment gas (11.96 liters/min., 1 ppm), the quantity of hydrocarbon that can be treated by the adsorbent at a temperature of 283 K and a pressure of 550 kPa, namely the hydrocarbon adsorption quantity, can be estimated.

EXAMPLES

For a series of commercially available H-FER, Na-MOR, H-MFI, Na-MFI and Cu-MFI adsorbents, as well as a K-MOR adsorbent produced by K ion exchange of the above Na-MOR adsorbent, and Ca-MFI and Zn-MFI adsorbents produced by Ca and Zn ion exchange of the above Na-MFI adsorbent, adsorption performance was determined using the breakthrough curve measurement method described above. These adsorbents are all zeolites that have a straight channel.

Comparative Examples

Using a commercially available NaX adsorbent, CaX adsorbent, H-MOR adsorbent and H-MFI adsorbent, adsorption performance was determined using the breakthrough curve measurement method described above.

Of these adsorbents, the H-MOR and H-MFI adsorbents have a straight channel, but the pore diameter is thought to be considerably larger than those of the above Na-MOR adsorbent and Cu-MFI adsorbent.

Table 1 shows the basic structure, the ions used for ion exchange, the Si/Al ratio, and the measurement results for the adsorption quantity of a series of hydrocarbons for each of the adsorbents measured in the examples and comparative examples.

TABLE 1

| Adsorbent | Structure | Exchange ion | Si/Al | Adsorption quantity [mmol/kg] | | | |
|---|---|---|---|---|---|---|---|
| | | | | Propane | Ethylene | Propylene | Acetylene |
| Example 1 | FER | H | 9 | 6.0 | 4.3 | ≧3.0* | ≧3.0* |
| Example 2 | MOR | Na | 9 | 1.8 | 1.7 | ≧3.0* | ≧3.0* |
| Example 3 | MOR | K | 9 | 1.6 | 0.75 | ≧3.0* | ≧3.0* |
| Example 4 | MFI | H | 15 | 2.1 | 3.1 | ≧3.0* | ≧3.0* |
| Example 5 | MFI | Na | 15 | 2.1 | 2.8 | ≧3.0* | ≧3.0* |
| Example 6 | MFI | Ca | 15 | 2.4 | 4.5 | ≧3.0* | ≧3.0* |
| Example 7 | MFI | Zn | 15 | 2.5 | ≧6.0* | ≧3.0* | ≧3.0* |
| Example 8 | MFI | Cu | 20 | 2.6 | ≧6.0* | ≧3.0* | ≧3.0* |
| Comparative example 1 | X | Na | 1.2 | 0.79 | 1.6 | ≧3.0* | ≧3.0* |
| Comparative example 2 | X | Ca | 1.2 | 0.87 | ≧3.0* | ≧3.0* | ≧3.0* |
| Comparative example 3 | MOR | H | 115 | 0.65 | 0.6 | ≧3.0* | 1.5 |
| Comparative example 4 | MFI | H | 940 | 1.0 | 0.5 | ≧3.0* | 0.86 |

In these measurements, continuous measurement was conducted for at least 6 hours, but no propylene was detected in the discharged gas from any of the adsorbents, no acetylene was detected for the adsorbents of the examples 1 through 8 and the comparative examples 1 and 2, and no ethylene was detected for the adsorbents of the examples 7 and 8 and the comparative example 2.

These adsorbents were assumed to have an adsorption quantity at least as large as the total quantity of propylene, acetylene or ethylene introduced into the column, and so the adsorption quantity was recorded as the total quantity of introduced propylene, acetylene or ethylene, and annotated with a * symbol.

Compared with the NaX adsorbent used in conventional pre-purification units, the adsorbents of the present invention exhibited excellent adsorption quantities, particularly for propane, where the maximum observed adsorption quantity was more than 6 times that of the conventional adsorbent, indicating that propane was able to be removed efficiently.

The adsorbents of the present invention also exhibited an ethylene adsorption quantity that was either equal or superior to that of the NaX adsorbent, and propylene and acetylene were also able to be removed at similar levels to those provided by the NaX adsorbent.

Although not shown in the examples, the adsorbents of the present invention are also able to remove trichloroethylene and trichloroethane.

Although the H-MOR and H-MFI adsorbents have a straight channel, the pore diameter is thought to be considerably larger than those of the above Na-MOR adsorbent and Cu-MFI adsorbent. Consequently, it is thought that a propane molecule with a kinetic diameter of 43 nm (calculated from the Lennard-Jones potential) is unable to obtain sufficient adsorption energy from the pore walls, resulting in a decrease in the adsorption quantity. Furthermore, in the case of adsorbents for which the Si/Al ratio exceeds 100, it is surmised that because the ion quantity that can undergo exchange is minimal, adjustment of the pore size is difficult.

Si/Al ratios of no more than 20 enable an increase in the ion exchange quantity, that is, the proportion of the adsorbent available for pore size adjustment, and are consequently preferred.

Conducting the same measurements at 333 K using the adsorbents of the examples 1 through 8 also returned favorable results.

As follows is a description of an example in which the H-FER adsorbent of the example 1 was used in the pre-purification unit of a cryogenic air separation unit.

Figure 5:
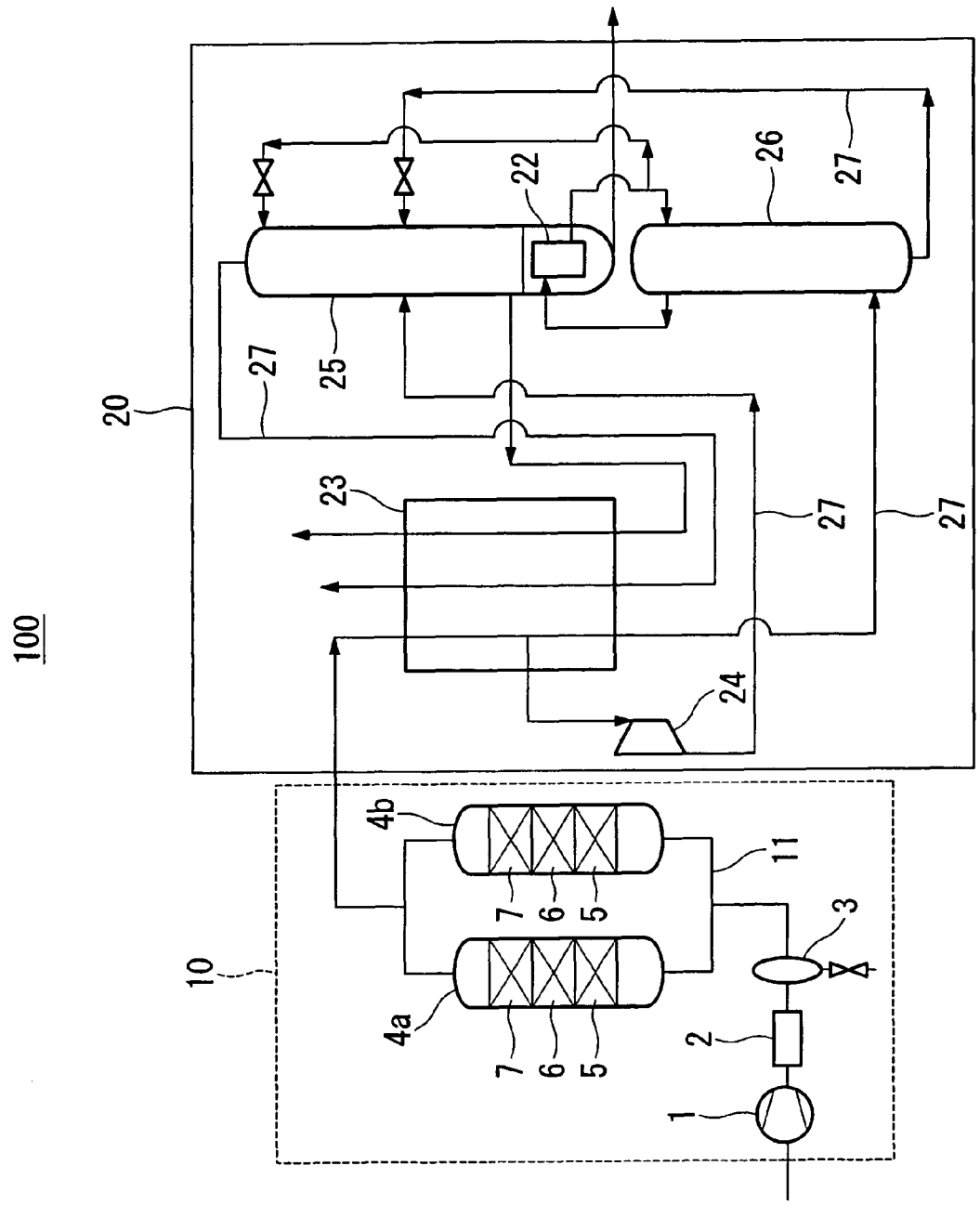
FIG. 5 is a system diagram of a cryogenic air separation unit.

FIG. 5 is a system diagram of a typical cryogenic air separation unit 100.

As shown in FIG. 5 this cryogenic air separation unit 100 includes a pre-purification unit 10 and a cryogenic air separation unit main body 20.

The pre-purification unit 10 shown in the figure is a typical TSA pre-purification unit. As shown in FIG. 5, this pre-purification unit 10 contains a compressor 1, a cooler 2, a drain separator 3, adsorption columns 4a and 4b, a heater (not shown in the figure), a silencer (not shown in the figure), piping 11 that interconnects these components, and valves (not shown in the figure) that are provided at positions along the piping.

On the other hand, as shown in FIG. 5, the cryogenic air separation unit main body 20 contains a liquid oxygen sump 22, a main heat exchanger 23, an expansion turbine 24, distillation columns 25 and 26, piping 27 that interconnects these components, and valves (not shown in the figure) that are provided at positions along the piping 27. This cryogenic air separation unit main body 20 is usually known as the "cold box", and in order to enable cold insulation at a temperature of approximately −200° C. for example, the low temperature equipment is housed inside a large casing, any spaces are filled with an insulating material such as perlite, and the casing is then vacuum insulated or insulated under normal pressure from the surrounding atmosphere.

Next is a description of the operation of each of the sections of the pre-purification unit 10.

Feed air that has been compressed to a predetermined pressure by the compressor 1 is cooled by the cooler 2, and following gas-liquid separation in the drain separator 3, is introduced into either the column 4a or the column 4b. The feed air that has been pre-treated by the columns 4a and 4b is then transported to the cryogenic air separation unit main body 20. The columns 4a and 4b are regenerated by a gas produced by using a heater to heat the exhaust gas discharged from the cryogenic air separation unit main body 20 to a predetermined temperature. The gas used for regeneration is discharged into the atmosphere from the silencer.

In the pre-purification unit 10 of the present invention, the columns 4a and 4b are packed with sequential layers of activated alumina 5, a NaX zeolite 6, and an adsorbent 7 of the present invention.

In a bench-scale test unit, the columns were packed with layers of activated alumina, the NaX zeolite, and the H-FER adsorbent. The ratio of the respective packing heights was 2:3:2.

Purified air was humidified, mixed with approximately 350 ppm of carbon dioxide and approximately 1 ppm of propane, and a purification test was conducted. When the propane concentration was measured downstream from the columns, using the process gas analyzer (RGA5) mentioned above, the level of propane was less than the detection limit.

Next, the same test was repeated using the K-MOR adsorbent from the example 3.

The ratio of the packing layers of activated alumina, the NaX zeolite, and the K-MOR adsorbent was 2:3:4.

As in the previous test, when the K-MOR adsorbent was used, the level of propane was less than the detection limit.

Because the K-MOR adsorbent has the lowest propane adsorption quantity amongst the adsorbents of the examples 1 through 8, it can be assumed that propane removal is also possible in TSA pre-purification units that use the other adsorbents.

A typical propane concentration in feed air is within a range from 1 to 3 ppb, but depending on the environment, concentration levels of several dozen ppb are also possible.

Using the TSA pre-purification unit 10, a simulation was conducted for the case where an adsorbent of the present invention was not used, to ascertain how the concentration of propane concentrated within the liquid oxygen sump 22 would alter as the propane concentration within the feed air was increased. It was found that when the level of propane in the feed air reached 100 ppb, the concentration of propane concentrated within the liquid oxygen sump 22 was approximately 2 ppm.

By using a TSA pre-purification unit 10 according to the present invention, propane within feed air can be removed down to a level of several ppb or less. The concentrating of propane within the liquid oxygen sump 22, or within other liquid oxygen inside the cryogenic air separation unit 100 can be prevented.

INDUSTRIAL APPLICABILITY

By using a zeolite having at least one straight channel as a hydrocarbon adsorbent within the pre-purification unit of a cryogenic air separation unit, the unit can be applied to the removal of ultra low concentrations of hydrocarbons, and particularly propane, from feed air.

The invention claimed is:

1. A pre-purification unit which is a thermal swing adsorption pre-purification unit comprising a column packed with a hydrocarbon adsorbent, wherein
    said hydrocarbon adsorbent comprises a zeolite that has a H-FER structure, or a Na-MOR structure or K-MOR structure in which a pore diameter has been adjusted by ion exchange, and a Si/Al ratio of no more than 20, and
    said column is packed with sequential layers of activated alumina, a NaX zeolite, and said hydrocarbon adsorbent.

2. A method of pre-treating raw air, comprising using a pre-purification unit of a cryogenic air separation unit to reduce a hydrocarbon concentration within liquid oxygen inside said cryogenic air separation unit, wherein
    said pre-purification unit is a thermal swing adsorption pre-purification unit comprising a column packed with a hydrocarbon adsorbent, and
    said hydrocarbon adsorbent comprises a zeolite that has a H-FER structure, or a Na-MOR structure or K-MOR structure in which a pore diameter has been adjusted by ion exchange, and a Si/Al ratio of no more than 20.

* * * * *